United States Patent
Li et al.

(10) Patent No.: US 9,992,767 B2
(45) Date of Patent: Jun. 5, 2018

(54) DATA TRANSMISSION METHOD AND DEVICE

(71) Applicant: ZTE CORPORATION, Shenzhen, Guangdong Province (CN)

(72) Inventors: Yonghua Li, Shenzhen (CN); Xiaomin Yang, Shenzhen (CN); Yangfeng Wang, Shenzhen (CN); Sheng You, Shenzhen (CN); Diqiang Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 252 days.

(21) Appl. No.: 14/416,972

(22) PCT Filed: Jul. 23, 2013

(86) PCT No.: PCT/CN2013/079940
§ 371 (c)(1),
(2) Date: Jan. 23, 2015

(87) PCT Pub. No.: WO2014/015799
PCT Pub. Date: Jan. 30, 2014

(65) Prior Publication Data
US 2015/0181585 A1 Jun. 25, 2015

(30) Foreign Application Priority Data
Jul. 23, 2012 (CN) .......................... 2012 1 0256042

(51) Int. Cl.
*H04W 72/04* (2009.01)
*H04L 12/46* (2006.01)
*H04L 1/00* (2006.01)

(52) U.S. Cl.
CPC .......... *H04W 72/0406* (2013.01); *H04L 1/00* (2013.01); *H04L 12/4633* (2013.01)

(58) Field of Classification Search
CPC ... H04W 72/0406; H04L 1/00; H04L 12/4633
See application file for complete search history.

(56) References Cited

U.S. PATENT DOCUMENTS 8,594,731 B2 * 11/2013 Sakama .............. H04W 88/085
370/431
2009/0291681 A1 * 11/2009 Hara .................... H04W 88/085
455/422.1
(Continued)

FOREIGN PATENT DOCUMENTS

CN 1859660 A 11/2006
CN 1917392 A 2/2007
(Continued)

OTHER PUBLICATIONS

International Search Report (Form PCT/ISA/210) for PCT/CN2013/079940 dated Oct. 31, 2013.
(Continued)

*Primary Examiner* — Ian N Moore
*Assistant Examiner* — Latresa McCallum
(74) *Attorney, Agent, or Firm* — Koppel, Patrick, Heybl & Philpott (57) ABSTRACT

Provided are a data transmission method and device, which relate to the field of communications. The method includes: when data is transmitted between an REC and one or more REs, arranging extended control words of the one or more REs in a plurality of superframes, wherein connotations of the extended control words at a same position in different superframes are different, and sending the plurality of superframes to an opposite end. By arranging extended control words of one or more REs in a plurality of superframes and different connotations of the extended control words at the same position in different superframes, the solution solves the problem that the requirements cannot be satisfied due to (Continued)

the limited number of control words in the protocol, and has the beneficial effect of increasing control words in the protocol.

11 Claims, 5 Drawing Sheets

(56) References Cited

U.S. PATENT DOCUMENTS

| | | | | |
|---|---|---|---|---|
| 2011/0032910 A1* | 2/2011 | Aarflot | ............ | H04J 3/0682 370/335 |
| 2011/0143813 A1* | 6/2011 | Ohashi | ............ | H04W 88/08 455/561 |
| 2013/0100948 A1* | 4/2013 | Irvine | ............ | H04J 3/0632 370/350 |

FOREIGN PATENT DOCUMENTS

| | | |
|---|---|---|
| CN | 101166335 A | 4/2008 |
| CN | 101174981 A | 5/2008 |
| CN | 101911826 A | 12/2010 |
| EP | 1843502 A1 | 10/2007 |
| JP | 2009284066 | 12/2009 |
| WO | WO 2009089652 A1 | 7/2009 |

OTHER PUBLICATIONS

Written Opinion of the International Searching Authority (Form PCT/ISA/237) for PCT/CN2013/079940 dated Oct. 31, 2013.
"CPRI Specification V5.0—Common Public Radio Interface (CPRI Interface Specification" © Ericsson AB, Huawei Technologies Co, Ltd., NEC corporation, Alcatel Lucent, and Nokia Siemens Networks GmbH & Co. KG., published Sep. 21, 2011.
Extended European Search Report from corresponding European Patent Appl. No. 13823434.9-1854, dated Aug. 5, 2015.
Office Action from corresponding Japanese Patent Appl. No. 2015-523400, dated Dec. 14. 2016.
State Intellectual Property Office of China Search Report No. 2012102560422, dated Jul. 23, 2012.

* cited by examiner

Fig. 1

| When data is transmitted between an REC and one or more REs, arranging extended control words of the one or more REs in a plurality of superframes, wherein the connotations of the extended control words at the same position in different superframes are different | — S202 |

| Sending the plurality of superframes to an opposite end | — S204 |

DATA TRANSMISSION METHOD AND DEVICE

TECHNICAL FIELD

The disclosure relates to the field of communications, in particular, to a data transmission method and device.

BACKGROUND

At present, the Common Public Radio Interface (abbreviated as CPRI) standard protocol is widely used in developing a distributed base station system in the communication industry. The CPRI protocol has stipulated a standard for the interface between a radio equipment controller (abbreviated as REC) and radio equipment (abbreviated as RE) in radio base station equipment.

Figure 1:
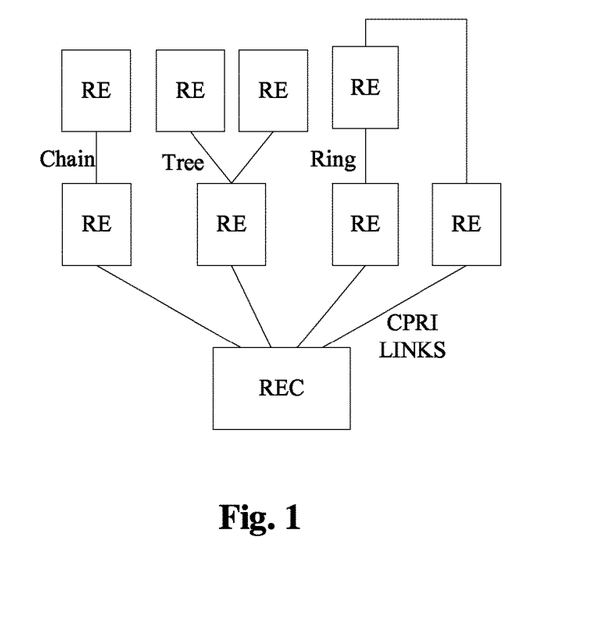
FIG. 1 is a schematic diagram of the linkage between one REC and multiple REs according to the related art.

FIG. 1 is a schematic diagram of the linkage between an REC and an RE according to the related art. As shown in FIG. 1, one REC may link with a plurality of REs, and each RE may also link with other REs, wherein the links among the REs may be of either a chain structure or a tree structure or a ring structure.

Take CPRI for example, the CPRI stipulates that the period of each basic frame is 1/3.84 M, which is composed of one 1 control word and an IQ area containing 15 words, wherein this control word is transmitted first. 256 basic frames compose one superframe, and 150 superframes compose one 10 ms radio frame. One superframe has only 256 control word fields, some of which are occupied by protocols and therefore available control word fields are actually less than 256.

With the constant development of the communication industry, both service types and the service data amount that are supported are continuously increasing, and the requirements on the control word of the protocols are also gradually increasing. However, the total number of control words in the protocol does not develop at the same pace, which therefore brings about the following problems: with the constant development of a user system, the requirements on control words constantly increase, and the specific information required by users is also constantly increasing, thus the limited number of control words in the protocol will inevitably be unable to satisfy the development of the user system.

As regards the problem in the related art that the control words are limited in number and are unable to satisfy the requirement, currently no effective solution is proposed yet.

SUMMARY

The embodiments of the disclosure provide a data transmission method and device to at least solve the above-mentioned problem.

According to an aspect of the embodiments of the disclosure, a data transmission method is provided, including: when data is transmitted between an REC and one or more REs, arranging extended control words of the one or more REs in a plurality of superframes, wherein connotations of the extended control words at a same position in different superframes are different; and sending the plurality of superframes to an opposite end.

In the described embodiment, the arranging the extended control words of the one or more REs in the plurality of superframes includes at least one of: respectively arranging extended control words of different REs in different superframes according to a predefined agreement; and arranging extended control words of one RE in different superframes according to a predefined agreement.

In the described embodiment, the arranging the extended control words of the one or more REs in the plurality of superframes when data is transmitted between the REC and the one or more REs includes: determining the number of superframes for transmitting the extended control words according to the number of extended control words required by the one or more REs and the number of basic frames for transmitting extended control words, wherein the number of superframes is at least two; and respectively arranging the extended control words of the one or more REs in the plurality of superframes determined.

In the described embodiment, the method further includes: the REC sending a self-inspection signalling packet to the one or more REs; the one or more REs performing data verification according to the self-inspection signalling packet; and the REC determining that a signalling state of the one or more REs is normal after receiving a response message fed back by the one or more REs indicating that the data verification performed according to the self-inspection signalling packet is passed.

In the described embodiment, the one or more REs performing the data verification according to the self-inspection signalling packet includes: a RE judging whether the self-inspection signalling packet is intended for the RE itself; when the RE determines that the self-inspection signalling packet is intended for the RE itself, performing the data verification according to the self-inspection signalling packet; otherwise, the RE forwarding the self-inspection signalling packet to one or more other REs for the one or more other REs to perform data verification; and after the data verification is passed, sending a response message to the REC indicating that the data verification performed according to the self-inspection signalling packet is passed.

According to another aspect of the embodiments of the disclosure, a data transmission device located on an REC and/or RE side is provided. The device includes: an arrangement component configured to arrange extended control words of one or more REs in a plurality of superframes when data is transmitted between an REC and the one or more REs, wherein connotations of the extended control words at a same position in different superframes are different; and a sending component configured to send the plurality of superframes to an opposite end.

In the described embodiment, the arrangement component is configured to: respectively arranging extended control words of different REs in different superframes according to a predefined agreement; and/or arranging extended control words of one RE in different superframes according to a predefined agreement.

In the described embodiment, the arrangement component is further configured to: determine the number of superframes for transmitting the extended control words according to the number of extended control words required by the one or more REs and the number of basic frames for transmitting extended control words, wherein the number of the superframes is at least two; and respectively arrange the extended control words of the one or more REs in the plurality of superframes determined.

In the described embodiment, the device further includes: a self-inspection component configured to determine that a signalling state of the one or more REs is normal according to a self-inspection response packet under a circumstance that the self-inspection response packet sent by the one or more REs is received, wherein the self-inspection response packet is sent by the one or more REs after data verification is performed according to a self-inspection signalling packet received from the REC and the data verification is passed.

In the described embodiment, the device further includes: a self-inspection component configured to judge whether a received self-inspection signalling packet sent by the REC is intended for a current RE, and perform data verification according to the self-inspection signalling packet under the circumstance that it is determined that the self-inspection signalling packet is intended for the current RE, otherwise, forward the self-inspection signalling packet to one or more other REs for the one or more other REs to perform data verification, and after the data verification is passed, send a response message to the REC indicating that the data verification performed according to the self-inspection signalling packet is passed.

By means of the embodiments of the disclosure, extended control words of one or more REs are arranged in a plurality of superframes when data is transmitted between the REC and the one or more REs, wherein the connotations of the extended control words at the same position in different superframes are different, and the plurality of superframes are sent to an opposite end, thereby solving the problem that the requirements cannot be satisfied due to the limited number of control words, and further achieving the beneficial effect of increasing the number of control words.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described in detail below with reference to the accompanying drawings and embodiments. Note that, the embodiments of the disclosure and the features of the embodiments can be combined with each other if there is no conflict.

Embodiment 1

Figure 2:
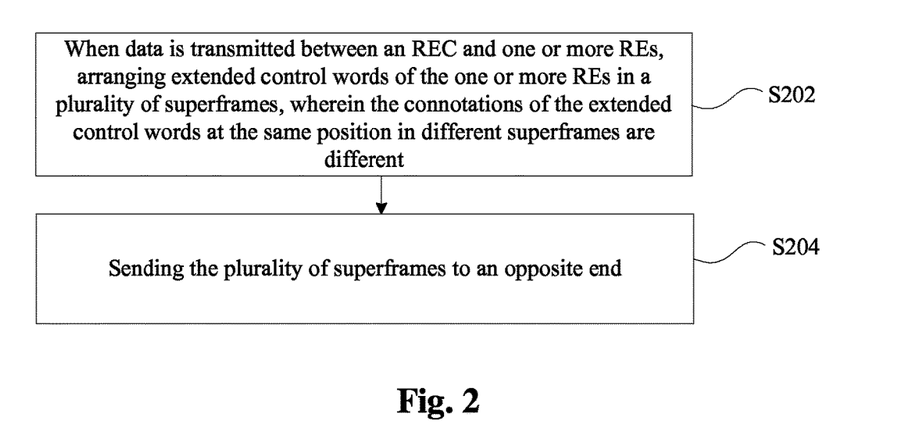
FIG. 2 is a flowchart of a data transmission method according to an embodiment of the disclosure.

An embodiment of the disclosure provides a data transmission method. FIG. 2 is a flowchart of a data transmission method according to an embodiment of the disclosure. As shown in FIG. 2, the flow includes the following steps.

Step S202, when data is transmitted between an REC and one or more REs, extended control words of the one or more Res are arranged in a plurality of superframes, wherein the connotations of the extended control words at the same position in different superframes are different.

Step S204, the plurality of superframes are sent to an opposite end.

By means of the above-mentioned steps, the extended control word information of one or more Res is arranged in a plurality of superframes, wherein the connotations of the extended control word information at the same position in different superframes are different. This solution changes the practice in the related art that connotations of control word information at the same position in different superframes are the same, and solves the problem that the requirements cannot be satisfied due to the limited number of control words by sending a plurality of superframes, in which the connotations of control words at the same position are different.

There are many kinds of ways for arranging extended control words. This example embodiment provides the following two ways: one way is to respectively arrange extended control word information of different REs in different superframes according to a predefined agreement, and the other way is to arrange extended control word information of one RE in different superframes according to a predefined agreement.

There are many kinds of ways for determining the plurality of superframes for arranging the control words. For example, the number of superframes for transmitting the extended control words may be determined according to the number of extended control words required by the one or more REs and the number of basic frames for transmitting extended control words, wherein the number of the superframes is at least two, and then the extended control words of the one or more REs are respectively arranged in the plurality of superframes determined. In this manner, it can be ensured that the number of superframes used is the least on the premise that the same number of extended control words is transmitted. It should be noted that other ways for determining superframes may also be adopted in other embodiments.

If it is possible to arrange control information of different REs in different superframes, then the REC may send a self-inspection signalling packet to the REs, so that the REs perform data verification according to the self-inspection signalling packet, and then after receiving a response message fed back by the REs indicating that the data verification performed according to the self-inspection signalling packet is passed, the REC determines that a signalling state of the REs is normal. Taking the CPRI protocol for example, because the CPRI protocol control words contain two kinds of signalling data: fast signalling data, i.e. Ethernet signalling data, and slow signalling data, i.e. high level data link control (abbreviated as HDLC) signalling data, the function of the logic is merely for under layer transmission, which transmits corresponding signalling data to software so that the software checks if the signalling data is correct, and the logic itself cannot tell the correctness of the transmitted data. Once an anomaly occurs in the signalling data, it is impossible to distinguish a software processing anomaly from a logic transmission anomaly, thereby increasing the difficulty in locating this kind of malfunction. This example embodiment changes the practice in the related art that the software checks the signalling data, thereby being able to directly determine whether the anomaly is a software anomaly or a logic transmission anomaly. It should be noted that other embodiments can do without self-inspection.

If the REC performs on-line self-inspection, then the RE judges whether the self-inspection signalling packet is intended for the RE itself, and performs data verification according to the self-inspection signalling packet when the RE determines that the self-inspection signalling packet is intended for the RE itself; otherwise, forwards the self-inspection signalling packet to one or more other REs for the one or more other REs to perform data verification; and after the data verification is passed, a response message is sent to the REC indicating that the data verification performed according to the self-inspection signalling packet is passed. In this embodiment, the fact that the self-inspection signalling packet received by the RE may be intended for either itself or other Res is considered, and different processing is required in different situations.

Embodiment 2

This embodiment provides a data transmission device for implementing the above-mentioned embodiment and example implementation, which are described already. As used below, the term "component" may implement a combination of software and/or hardware with predetermined functions. Although the device described in the following embodiment can better be implemented via software, it is also possible and conceivable to implement via hardware or a combination of software and hardware.

Figure 3:
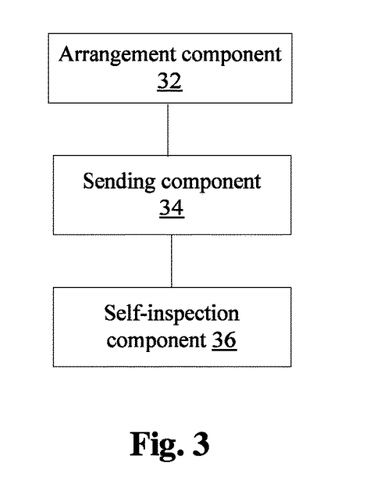
FIG. 3 is a block diagram showing the structure of a data transmission device according to an embodiment of the disclosure.

FIG. 3 is a block diagram showing the structure of a data transmission device according to an embodiment of the disclosure. As shown in FIG. 3, the device includes an arrangement component 32 and a sending component 34. Below is a description of the structure.

The arrangement component 32 is configured to arrange extended control words of one or more REs (RE) in a plurality of superframes when data is transmitted between the REC and the one or more REs, wherein the connotations of the extended control words at the same position in different superframes are different; and the sending component 34 is configured to send the plurality of superframes to an opposite end.

In an example embodiment, the arrangement component 32 is configured to: respectively arrange extended control words of different REs in different superframes according to a predefined agreement; and/or arrange extended control words of one RE in different superframes according to a predefined agreement.

In an example embodiment, the arrangement component 32 is further configured to: determine the number of superframes for transmitting the extended control words according to the number of extended control words required by the one or more REs and the number of basic frames for transmitting extended control words, wherein the number of the superframes is at least two; and respectively arrange the extended control words of the one or more REs in the plurality of superframes determined.

In an example embodiment, the device further includes a self-inspection component 34 configured to determine that a signalling state of the one or more REs is normal according to a self-inspection response packet under the circumstance that the self-inspection response packet sent by the one or more REs is received, wherein the self-inspection response packet is sent by the one or more REs after data verification is performed according to a self-inspection signalling packet received from the REC and the data verification is passed.

In an example embodiment, the self-inspection component 34 is configured to perform data verification according to the self-inspection signalling packet under the circumstance that it is determined that a received self-inspection signalling packet sent by the REC is intended for the current RE, otherwise, forward the self-inspection signalling packet to one or more other REs for the one or more other REs to perform data verification, and after the data verification is passed, send a response message to the REC indicating that the data verification performed according to the self-inspection signalling packet is passed.

Embodiment 3

This embodiment assumes that one REC links with 3 REs (RE1\RE2\RE3) at the same time, with the 3 REs being of a chain topology structure. Each RE needs to extend X extended control words at downlink, and one basic frame transmits one fixed control word only.

Figure 4:
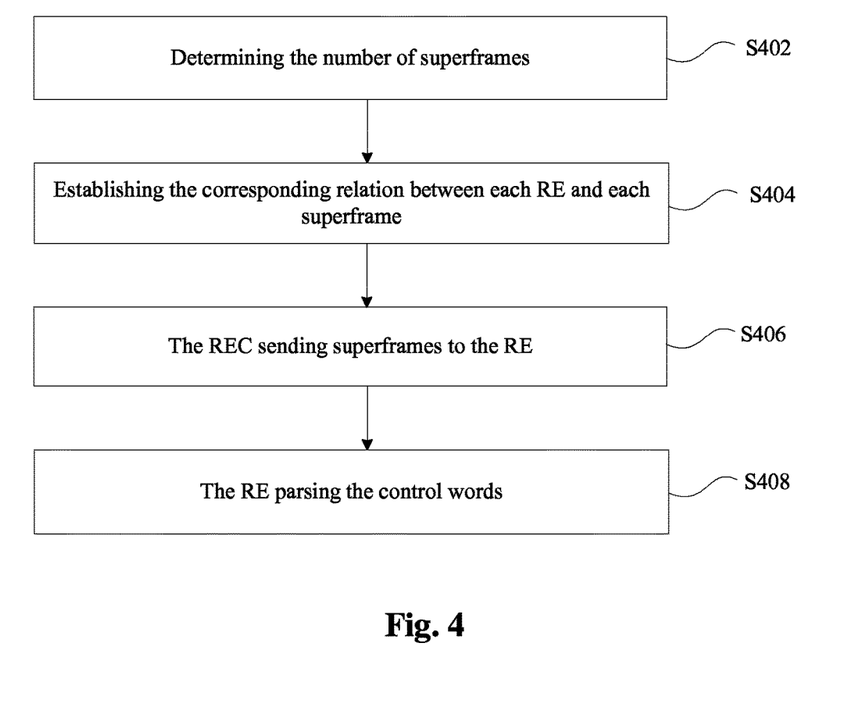
FIG. 4 is a first flowchart of a data transmission method according to an example embodiment of the disclosure.

FIG. 4 is a first flowchart of a data transmission method according to an example embodiment of the disclosure. As shown in FIG. 4, the flow includes the following steps.

Step S402, the number of superframes is determined.

Figure 4A:
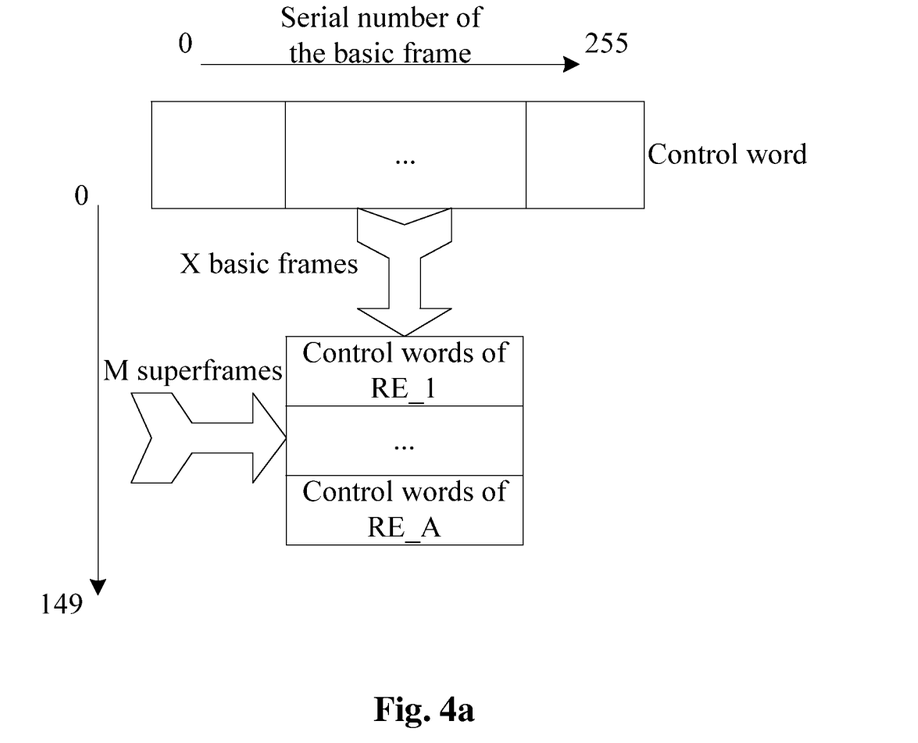
FIG. 4a is a schematic diagram of a way for extending control words in the CPRI according to an embodiment of the disclosure.

The REC needs to first determine the number of required superframes before sending IQ data to the RE. FIG. 4a is a schematic diagram of a way for extending control words in the CPRI according to an embodiment of the disclosure. As shown in FIG. 4a, X basic frames in the M superframes are used to transmit extended control words of A different REs. Specifically, X (X>=1) basic frames are chosen from 256 basic frames for extending X extended control words, and M superframes out of 150 superframes are determined according to the specific value of X to transmit extended control words of each RE. In this embodiment, it is assumed that each RE needs two superframes to achieve downlink extension, then three REs need 6 superframes totally, i.e. M=6.

Step S404, the corresponding relation between each RE and each superframe is established.

The downlink REC respectively arranges extended control words of different REs in M (M=6) superframes. It is possible to arrange X extended control words of RE1 in the 0\1 superframe, arrange X extended control words of RE2 in the 2\3 superframe, and arrange X extended control words of RE3 in the 4\5 superframe according to a predefined agreement; that is to say, X basic frames transmit specific extended control words of different REs in different superframes according to the predefined agreement.

Step S406, the REC sends the superframes to the RE.

The REC sends M (M=6) superframes to the RE. After the REC sends M superframes, i.e. sends extended control words of all REs, the REC may cyclically send the extended control words to the REs according to the number of the superframes again.

Step S408, the REs parse the control words.

All the downlink REs parse X basic frames in different superframes according to the number of the superframes. After receiving a superframe, RE1 judges whether the superframe is the 0\1 superframe, and if yes, parses the corresponding extended control words, and RE2 and RE3 do not process this superframe; otherwise, transmits the superframe to RE2, and RE2 judges whether the received superframe is the 2\3 superframe, and if yes, parses the corresponding extended control words; otherwise, transmits the superframe to RE3. The processing process of RE3 is as above and will not be described here again.

By means of the above-mentioned technical solution, the control word extension of the CPRI protocol can be implemented, and this protocol control word extension method may be used in other similar protocols.

Embodiment 4

This embodiment assumes that one REC links with 3 REs (RE1\RE2\RE3) at the same time, with the 3 REs being of a chain topology structure. Each RE needs to extend Y extended control words at uplink, and one basic frame transmits one fixed control word only.

Figure 5:
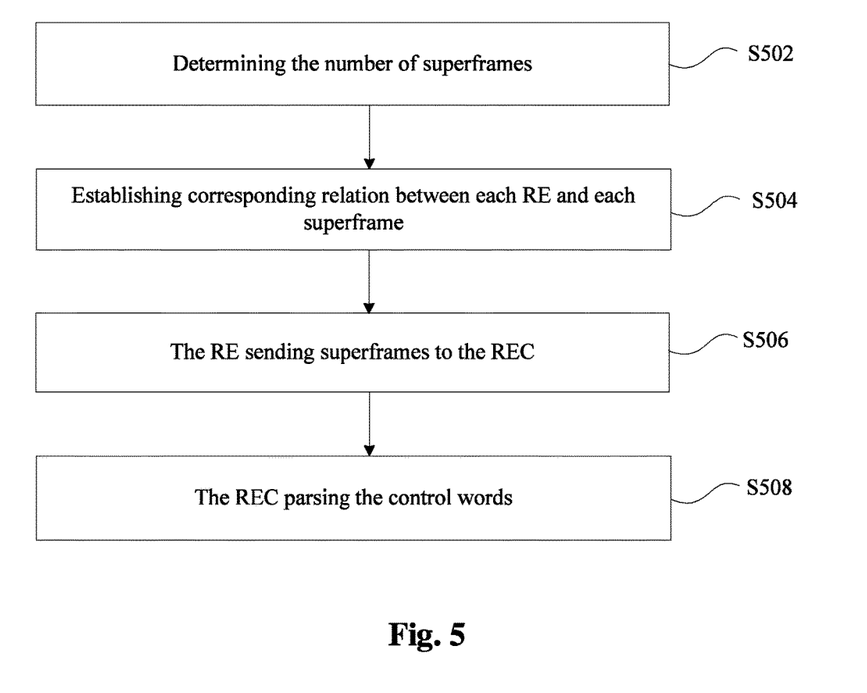
FIG. 5 is a second flowchart of the data transmission method according to an example embodiment of the disclosure.

FIG. 5 is a second flowchart of the data transmission method according to an example embodiment of the disclosure. As shown in FIG. 5, the flow includes the following steps.

Step S502, the number of superframes is determined.

When the RE sends IQ data to the REC at uplink, Y basic frames are chosen to extend Y extended control words, and the number of required superframes is determined according to the specific value of Y. In this embodiment, it is assumed that each RE needs two superframes to achieve uplink extension, then three REs need 6 (M=6) superframes totally.

Step S504, the corresponding relation between each RE and each superframe is established.

The uplink RE3 transmits Y extended control words to RE2 in the 0\1 superframe; RE2 saves the extended control words of RE3, then transmits the Y extended control words of RE2 itself to RE1 in the 0\1 superframe, and transmits the extended control words of RE3 to RE1 in the 2\3 superframe. The RE1 respectively arranges extended control words of RE1, RE2, and RE3 in the 0\1, 2\3, and 4\5 superframes. That is to say, the corresponding extended control word information of all REs in the uplink is respectively arranged in different superframes, i.e. one superframe contains the dedicated extended control word of one corresponding RE.

Step S506, the RE sends the superframes to the REC.

RE1 sends to the REC the 0\1, 2\3 and 4\5 superframes in which the extended control words of RE1, RE2 and RE3 are respectively arranged. After all REs finish sending extended control words, the REs may continually send extended control words of their own according to the number of the superframes again, and the cycle goes on like this.

Step S508, the REC parses the control words.

The REC respectively performs parsing and processing according to the superframe number. When the superframe number is 0\1, extended control words of RE1 are parsed out; when the superframe number is 2\3, extended control words of RE2 are parsed out; and when the superframe number is 4\5, extended control words of RE3 are parsed out.

By means of the above-mentioned technical solution, the extension of extended control word of the CPRI protocol can be implemented, and this extension method for the extended control word of the current protocol can be used in other similar protocols.

Embodiment 5

This embodiment assumes that one REC links with 3 REs (RE1\RE2\RE3) at the same time, with the 3 REs being of a chain topology structure.

Figure 6:
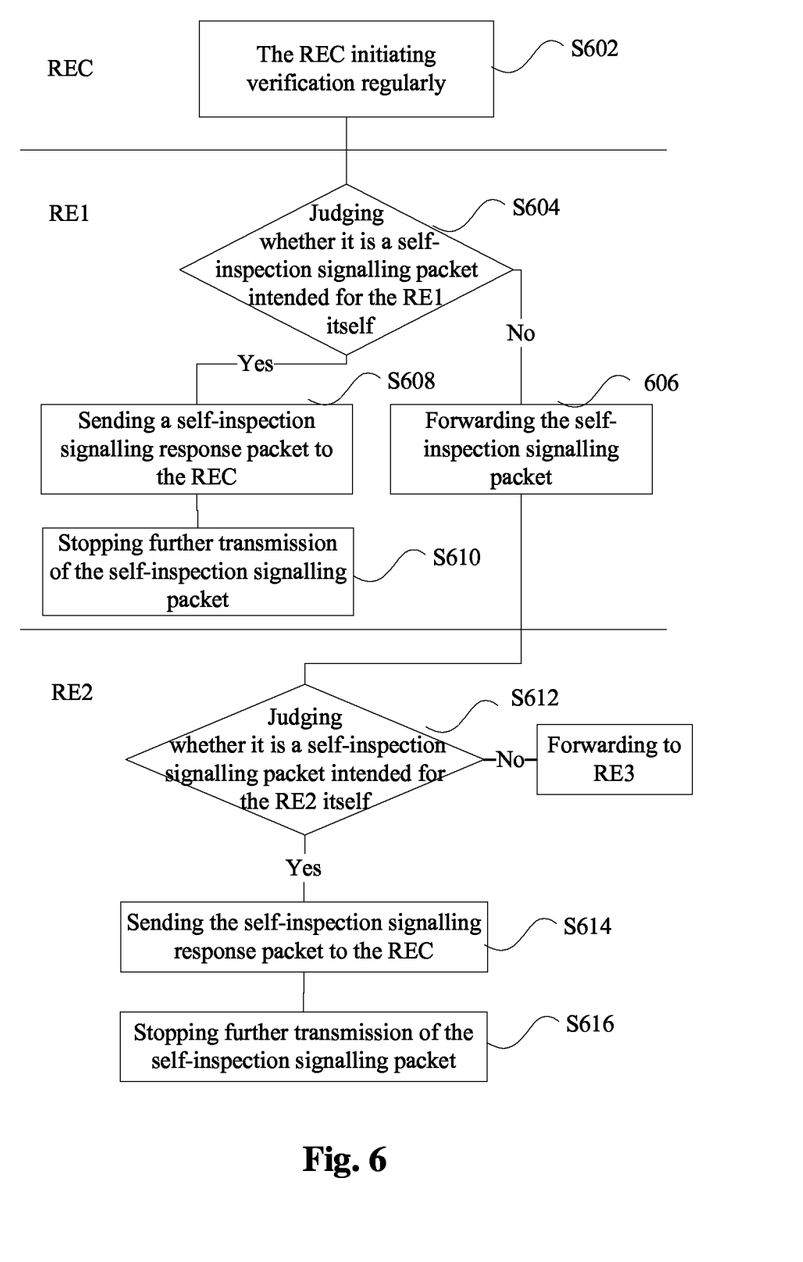
FIG. 6 is a flowchart of a method for downlink processing of signalling on-line self-inspection according to an example embodiment of the disclosure.

FIG. 6 is a flowchart of a method for downlink processing of signalling on-line self-inspection according to an example embodiment of the disclosure. As shown in FIG. 6, the flow includes the following steps.

Step S602, the REC initiates verification regularly.

The REC initiates verification regularly and sends a self-inspection signalling packet in the downlink, wherein this self-inspection signalling packet is a self-defined packet in a special packet format. The REC verifies the signalling state of one RE at a time.

Step S604, RE1 judges whether it is a self-inspection signalling packet intended for the RE1 itself.

After receiving the self-inspection signalling packet, RE1 judges whether the self-inspection signalling packet is intended for the RE1 itself. If the self-inspection signalling packet is intended for the RE1 itself, step S608 is performed; otherwise, step S606 is performed.

Step S606, the self-inspection signalling packet is forwarded.

RE1 forwards the self-inspection signalling packet to RE2 and then step S612 is performed.

Step S608, a self-inspection response packet is sent to the REC.

RE1 judges whether the content of the self-inspection signalling packet is correct or not, and if the content is correct, sends a self-inspection response packet to the REC. After receiving a correct self-inspection response packet, the REC deems that the signalling state of RE1 is normal.

Step S610, RE1 stops further transmission of the self-inspection signalling packet.

RE1 stops further transmission of the self-inspection signalling packet to not send the self-inspection signalling packet to RE2 and RE3, and the current flow ends.

Step S612, RE2 judges whether it is a self-inspection signalling packet intended for the RE2 itself.

RE2 judges whether it is the self-inspection signalling packet intended for the RE2 itself, and if the self-inspection signalling packet is intended for the RE2 itself, performs steps S614; otherwise, forwards the self-inspection signalling packet to RE3. The processing flow of RE3 is similar to RE2 and will not be described again here.

Step S614, a self-inspection response packet is sent to the REC.

After it is determined that the content of the self-inspection signalling packet is correct, a self-inspection response packet is sent and forwarded to the REC via RE1. After receiving the correct self-inspection response packet, the REC deems that the signalling state of RE2 is normal.

Step S616, the self-inspection signalling packet is stopped from further transmission.

RE2 stops further transmission of the self-inspection signalling packet to not send the self-inspection signalling packet to RE3.

By means of the above-mentioned technical solution, the signalling on-line self-inspection of the CPRI protocol can be implemented, and this self-inspection method can be used in other similar protocols.

It can be seen from the above description that the embodiments of the disclosure implement the following technical effect: the protocol is made to support more control words and self-inspection of control words in the protocol can be implemented.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined in the appended claims of the disclosure.

What is claimed is:

1. A data transmission method, comprising:
when data is transmitted between a radio equipment controller (REC) and one or multiple radio equipment (REs), arranging extended control words of the one or multiple REs in a plurality of superframes, wherein the extended control words at a same position in different superframes are used for indicating different types of information; and
sending the plurality of superframes to an opposite end; wherein the method further comprises:
the REC sending a self-inspection signalling packet to the one or multiple REs;
the one or multiple REs performing data verification according to the self-inspection signalling packet; and
the REC determining that a signalling state of the one or multiple REs is normal after receiving a response message fed back by the one or multiple REs indicating that the data verification performed according to the self-inspection signalling packet is passed; and
wherein the one or multiple REs performing the data verification according to the self-inspection signalling packet comprises:
a RE judging whether the self-inspection signalling packet is intended for the RE itself; when the RE determines that the self-inspection signalling packet is intended for the RE itself, the RE performing the data verification according to the self-inspection signalling packet; otherwise, the RE forwarding the self-inspection signalling packet to one or multiple other REs for the one or multiple other REs to perform data verification; and after the data verification is passed, sending the response message to the REC indicating that the data verification performed according to the self-inspection signalling packet is passed.

2. The data transmission method according to claim 1, wherein the arranging the extended control words of the multiple REs in the plurality of superframes comprises at least one of:
respectively arranging extended control words of different REs in different superframes according to a first predefined agreement; and
determining number of superframes for transmitting the extended control words according to number of extended control words required by the multiple REs and number of basic frames for transmitting extended control words, wherein the number of superframes is at least two, and respectively arranging the extended control words of the multiple REs in the plurality of superframes so determined.

3. The data transmission method according to claim 2, wherein the arranging the extended control words of the one or multiple REs in the plurality of superframes when data is transmitted between the REC and the one or multiple REs comprises:
determining number of superframes for transmitting the extended control words according to number of extended control words required by the one or multiple REs and number of basic frames for transmitting extended control words, wherein number of superframes is at least two; and
respectively arranging the extended control words of the one or multiple REs in the plurality of superframes determined.

4. The data transmission method according to claim 1, wherein the arranging the extended control words of the one RE in the plurality of superframes comprises at least one of:
arranging extended control words of the one RE in different superframes according to a second predefined agreement;
determining number of superframes for transmitting the extended control words according to number of extended control words required by the one RE and number of basic frames for transmitting extended control words, wherein number of superframes is at least two; and
respectively arranging the extended control words of the one RE in the plurality of superframes so determined.

5. A data transmission device located on a radio equipment controller (REC) side and/or radio equipment (RE) side, wherein the data transmission device comprises:
an arrangement component configured to arrange extended control words of one or multiple REs in a plurality of superframes when data is transmitted between the REC and the one or multiple REs, wherein the extended control words at a same position in different superframes are used for indicating different types of information; and
a sending component configured to send the plurality of superframes to an opposite end;
wherein the data transmission device further comprises:
a self-inspection component configured to judge whether a received self-inspection signalling packet sent by the REC is intended for a current RE, and perform data verification according to the self-inspection signalling packet under a circumstance that the self-inspection signalling packet is determined to be intended for the current RE, otherwise, forward the self-inspection signalling packet to one or multiple other REs for the one or multiple other REs to perform data verification; and after the data verification is passed, send a response message to the REC indicating that the data verification performed according to the self-inspection signalling packet is passed.

6. The data transmission device according to claim 5, wherein the arrangement component is configured to:
respectively arrange extended control words of different REs in different superframes according to a first predefined agreement; and/or
determine number of superframes for transmitting the extended control words according to number of extended control words required by the multiple REs and number of basic frames for transmitting extended control words, wherein the number of the superframes is at least two, and respectively arrange the extended control words of the multiple REs in the plurality of superframes so determined.

7. The data transmission device according to claim 6, wherein the arrangement component is further configured to:
  determine number of superframes for transmitting the extended control words according to number of extended control words required by the one or multiple REs and number of basic frames for transmitting extended control words, wherein number of the superframes is at least two; and
  respectively arrange the extended control words of the one or multiple REs in a plurality of superframes so determined.

8. The data transmission device according to claim 6, wherein the data transmission device further comprises:
  a self-inspection component configured to determine that a signalling state of the one or multiple REs is normal according to a self-inspection response packet under a circumstance that the self-inspection response packet sent by the one or multiple REs is received, wherein the self-inspection response packet is sent by the one or multiple REs after data verification is performed according to a self-inspection signalling packet received from the REC and the data verification is passed.

9. The data transmission device according to claim 5, wherein the arrangement component is further configured to:
  arrange extended control words of one RE in different superframes according to a second predefined agreement; and/or
  determine number of superframes for transmitting the extended control words according to number of extended control words required by the one or more REs and number of basic frames for transmitting extended control words, wherein number of the superframes is at least two; and
  respectively arrange the extended control words of the one RE in the plurality of superframes so determined.

10. The data transmission device according to claim 9, wherein the data transmission device further comprises:
  a self-inspection component configured to determine that a signalling state of the one or multiple REs is normal according to a self-inspection response packet under a circumstance that the self-inspection response packet sent by the one or multiple REs is received, wherein the self-inspection response packet is sent by the one or multiple REs after data verification is performed according to a self-inspection signalling packet received from the REC and the data verification is passed.

11. The data transmission device according to claim 5, wherein the data transmission device further comprises:
  a self-inspection component configured to determine that a signalling state of the one or multiple REs is normal according to a self-inspection response packet under a circumstance that the self-inspection response packet sent by the one or multiple REs is received, wherein the self-inspection response packet is sent by the one or multiple REs after data verification is performed according to a self-inspection signalling packet received from the REC and the data verification is passed.

* * * * *